(12) United States Patent
Cowan

(10) Patent No.: US 7,343,974 B2
(45) Date of Patent: Mar. 18, 2008

(54) METHOD AND APPARATUS FOR PERFORMING CHEMICAL TREATMENTS OF EXPOSED GEOLOGICAL FORMATIONS

(75) Inventor: Kenneth Michael Cowan, Sugar Land, TX (US)

(73) Assignee: Shell Oil Company, Houston, TX (US)

( * ) Notice: Subject to any disclaimer, the term of this patent is extended or adjusted under 35 U.S.C. 154(b) by 247 days.

(21) Appl. No.: 11/143,526

(22) Filed: Jun. 2, 2005

(65) Prior Publication Data

US 2005/0269080 A1    Dec. 8, 2005

Related U.S. Application Data

(60) Provisional application No. 60/576,645, filed on Jun. 3, 2004.

(51) Int. Cl.
*E21B 33/138* (2006.01)
(52) U.S. Cl. .............. 166/295; 166/250.14; 166/300; 175/72
(58) Field of Classification Search ............ None
See application file for complete search history.

(56) References Cited

U.S. PATENT DOCUMENTS

| | | | |
|---|---|---|---|
| 3,536,137 A | 10/1970 | Walther ................... 166/295 |
| 3,759,327 A | 9/1973 | Carnes ..................... 166/295 |
| 3,950,238 A | 4/1976 | Eldred ................. 204/159.15 |
| 4,042,032 A | 8/1977 | Anderson et al. ......... 166/276 |
| 4,355,122 A | 10/1982 | Fan ......................... 523/423 |
| 4,427,069 A | 1/1984 | Friedman et al. ........ 166/295 |
| 4,482,015 A | 11/1984 | Falk ......................... 166/288 |
| 4,538,221 A * | 8/1985 | Crain et al. ................. 700/67 |
| 4,556,109 A | 12/1985 | Eilers et al. ............... 166/295 |
| 4,649,998 A | 3/1987 | Friedman .................. 166/294 |
| 4,669,543 A | 6/1987 | Young ....................... 166/276 |
| 4,721,160 A | 1/1988 | Parcevaux et al. ......... 166/293 |
| 4,936,385 A | 6/1990 | Weaver et al. ............. 166/288 |
| 5,101,900 A | 4/1992 | Dees ......................... 166/250 |
| 5,145,013 A | 9/1992 | Dees et al. ................. 166/295 |
| 5,154,230 A | 10/1992 | Dees ......................... 166/277 |
| 5,159,980 A | 11/1992 | Onan et al. ................ 166/294 |
| 5,178,218 A | 1/1993 | Dees ......................... 166/281 |
| 5,201,612 A | 4/1993 | Gadelle et al. ............ 405/264 |

(Continued)

FOREIGN PATENT DOCUMENTS

DE         2624715         12/1977

(Continued)

OTHER PUBLICATIONS

International Search Report dated Dec. 15, 2005.

(Continued)

*Primary Examiner*—Zakiya W. Bates

(57) ABSTRACT

A method for strengthening a wellbore with an exposed geological formation, the method including: determining or estimating material properties of the exposed geological formation; determining changes necessary in material properties of the exposed geologic formation to achieve desired improvements in property of the exposed geologic formation; and treating the geological formation to improve material property values by injecting a formulation that hardens in-situ to form a geosynthetic composite. In another aspect, an apparatus for utilizing the described method with minimal handling of chemicals includes is an automated in-line chemical metering and pumping apparatus that requires no large mixing tank.

43 Claims, 3 Drawing Sheets

U.S. PATENT DOCUMENTS

| | | | |
|---|---|---|---|
| 5,258,072 A | 11/1993 | Gopalkirshnan et al. | 106/802 |
| 5,343,941 A * | 9/1994 | Raybon | 166/53 |
| 5,443,123 A | 8/1995 | Wall et al. | 166/288 |
| 5,849,674 A | 12/1998 | Fox et al. | 507/140 |
| 6,034,160 A | 3/2000 | Eaton et al. | 524/376 |
| 6,177,483 B1 | 1/2001 | Tehrani et al. | 523/130 |
| 2001/0032723 A1 | 10/2001 | Chatterji et al. | 166/295 |
| 2003/0092582 A1 | 5/2003 | Reddy et al. | 507/100 |

FOREIGN PATENT DOCUMENTS

| | | |
|---|---|---|
| EP | 462.880 A1 | 12/1991 |
| EP | 476.820 A2 | 3/1992 |
| EP | 0520839 A1 | 12/1992 |
| WO | 94/12445 | 6/1994 |
| WO | 97/15746 | 5/1997 |

OTHER PUBLICATIONS

Written Opinion dated Dec. 15, 2005.

TH2734 PCT/US2005/019385, International Search Report dated Sep. 21, 2005.

TH2734 PCT/US2005/019385, Written Opinion dated Sep. 30, 2005.

TH2461 PCT/US2005/019329, Written Opinion dated Sep. 30, 2005.

TH2461 PCT/US2005/019329, International Search Report dated Sep. 30, 2005.

\* cited by examiner

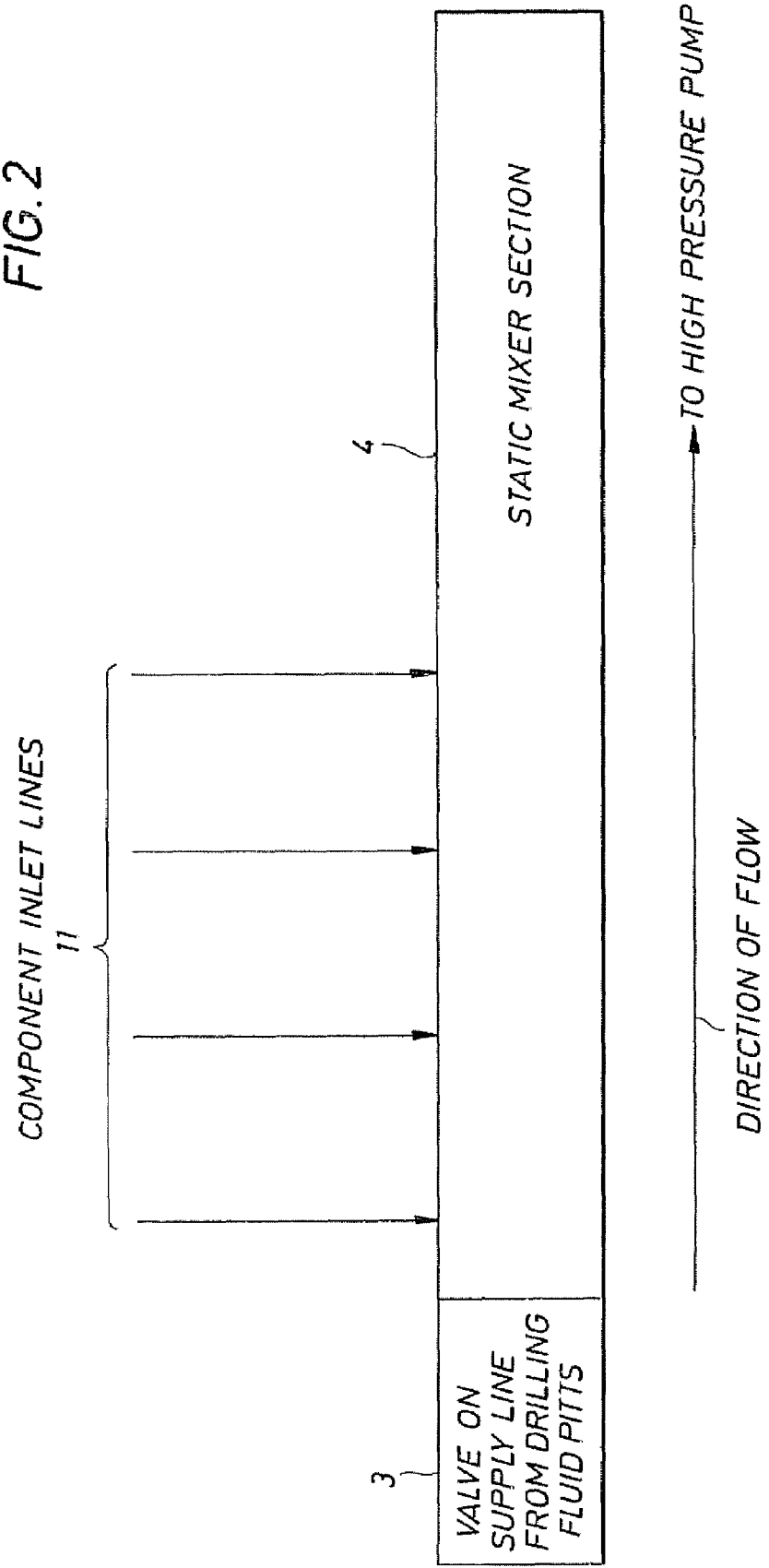

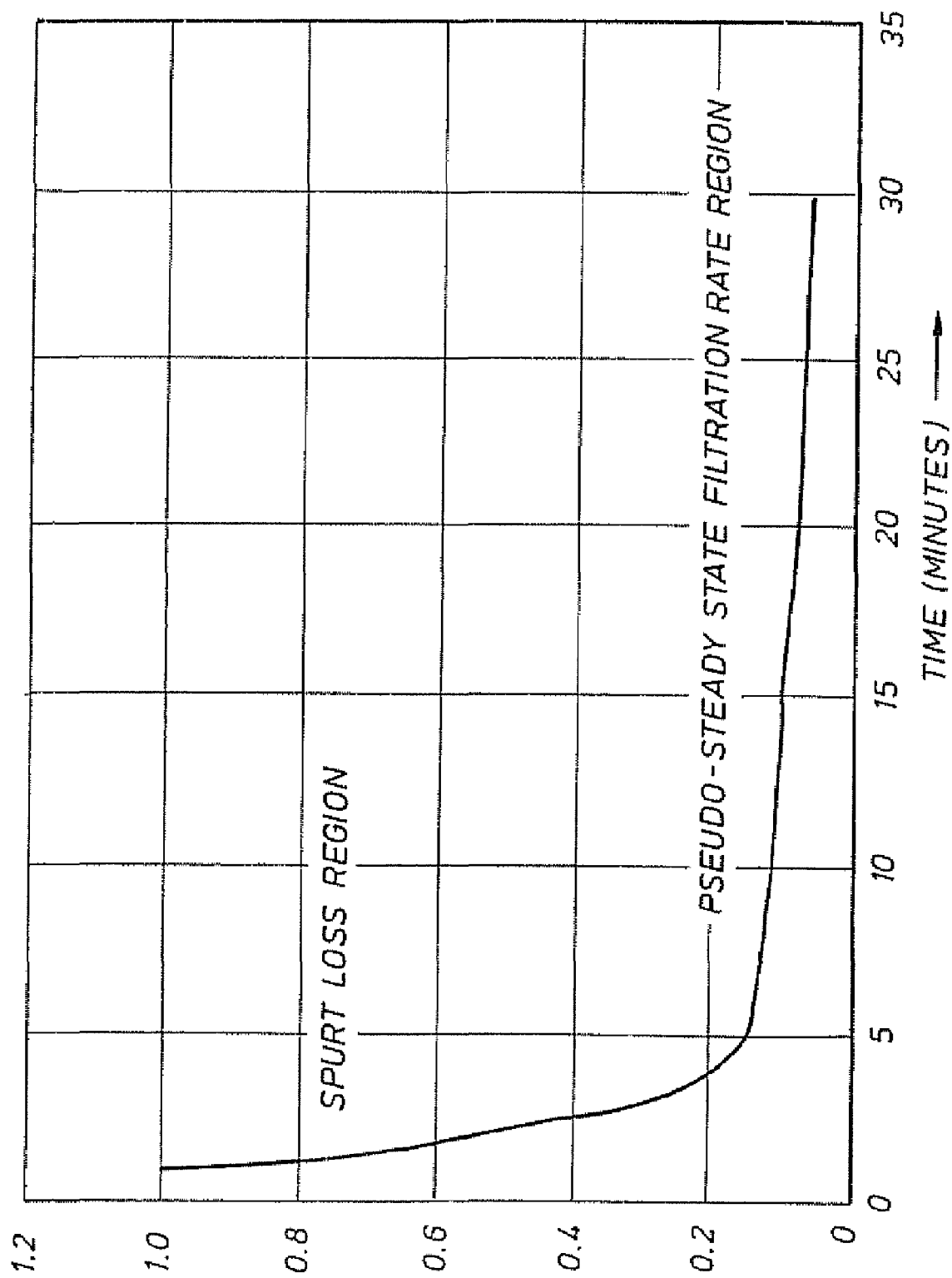

METHOD AND APPARATUS FOR PERFORMING CHEMICAL TREATMENTS OF EXPOSED GEOLOGICAL FORMATIONS

The present application claims priority to U.S. application Ser. No. 60/576,645, filed Jun. 3, 2004.

FIELD OF THE INVENTION

This invention relates to chemical treatment of a wellbore. More particularly, this invention relates to a method and apparatus for performing chemical treatments of exposed geological formations in a wellbore utilizing a geosynthetic composite to improve properties over the untreated geological formation.

BACKGROUND OF THE INVENTION

Boreholes created into the earth for extraction of mineral deposits such as oil and natural gas pass through numerous and varied geologic formations. These geologic formations have varied chemical compositions, permeabilities, porosities, pore fluids, internal (pore) pressures, and material properties. Important material properties that significantly impact well construction operations include compressive strength, tensile strength, fracture initiation pressure, fracture propagation pressure, Young's (elastic) modulus, Poisson ratio and bulk modulus.

Wide contrasts in formation pressures, formation material properties, and formation fluid types often require isolation and treatment of certain geologic formations. Attempts may be made to isolate specific formations and reinforce them with steel casing, or with cement or other treatments known in the art. Where steel casings are cemented in a borehole to isolate geologic formations having significantly different properties, each of these casing strings is costly and results in a reduction in the diameter of the borehole in subsequent sections as the borehole is deepened. It is desirable, therefore, to minimize the number of casing strings required to reach the desired depth.

It is also known in the art to use cement to line boreholes, however a disadvantage of cement is that the curing step may require up to 24 hours, which is a disproportionately long period of time to wait, especially when the production site is a very costly offshore operation. A further disadvantage of cement is that in view of its particle based structure the material exhibits relatively poor penetration capability in formations, which may result in reduced sealing effect.

Various sealants are known in the art for lining or strengthening boreholes. Where sealants are employed, a resin or monomer must be selected for each well that is compatible with the drilling/completion fluid. Epoxy resins provide the best compressive strength, tensile strength and adhesion properties. However, epoxy resins and/or their curing agents generally have poor compatibility and poor performance with olefins, esters, and paraffinic hydrocarbon fluid.

Acrylate or methacrylate resins/monomers are available that are soluble in the olefin, ester, and paraffinic hydrocarbon fluids. However, alone, these monomers and resins fail to provide the type of material properties required for geosynthetic composite linings. They typically have poor tensile strength, poor fracture toughness, and low compressive strength. Blends of acrylate monomers containing prepolymers have improved tensile strength, compressive strength, and fracture toughness. However, the prepolymers used in these blends are often insoluble in the hydrocarbon fluids previously discussed.

Various methods of utilizing cements and sealants for sand consolidation are known. Sealants that have been used include, for example, a rubber based emulsion (U.S. Pat. No. 4,649,998), a rubber latex based composition (U.S. Pat. No. 5,159,980), and cement based compositions, sometimes with styrene/butadiene added (U.S. Pat. Nos. 4,721,160 and 5,258,072). Also see U.S. Pat. No. 6,177,483 which utilizes a latex based setting composition. These references typically describe the use of the described materials in sand consolidation rather than for generally strengthening the borehole to eliminate the need for a casing.

U.S. Pat. No. 5,849,674 discloses a composition comprising a clay, a polymer, a crosslinking agent, and a liquid, wherein said clay, polymer, crosslinking agent, and liquid are each present in said composition in an amount effective to form a gel.

U.S. Pat. No. 5,443,123 discloses a method of consolidating an incompetent particulate in a subterranean formation penetrated by a wellbore accomplished by introducing fluids to be injected into a wellbore into coiled tubing while the tubing is outside the wellbore and thereafter pumping the fluids from the coiled tubing into the wellbore after circulating ports open in response to initiation of a variable delay firing head for ignition of a gas generator.

Various processes for formation consolidation are disclosed, for example, in U.S. Pat. Nos. 3,536,137; 3,759,327; 4,042,032; 4,427,069; 4,669,543; 5,101,900; 5,145,013; 5,154,230; 5,178,218; and 4,936,385.

It is known in the art to use automated systems to dispense chemical treatments. Often the chemicals are mixed in large tanks that have to be cleaned and personnel are often exposed to harmful chemicals in the process of mixing and later cleaning the vessels.

There is a need in the art for a method of analyzing the material properties of exposed geological formations and determining the required changes in material properties of the exposed formation needed to continue drilling operations, while reducing or eliminating the need for setting additional casing string. In addition it would be very valuable if there were a system and apparatus available to select chemical treatment type based on material properties of the geological formation and to have the capability of automatically applying the treatment in a manner in which personnel do not have to mix harmful chemicals or clean tanks contaminated with harmful chemicals.

SUMMARY OF THE INVENTION

In accordance with the foregoing the present invention is a method, for example, for minimizing the need for additional casings as a well is drilled deeper. The method comprises the steps of: determining or estimating material properties of exposed geological formations in a formation; determining changes required in material properties of exposed geologic formation in order to achieve desired improvements in property of the exposed geologic formation; and treating geological formation to obtain required improved material property values by injecting a chemical treatment into the wellbore in the vicinity of the formation to create a geosynthetic composite extending radially from the borehole wall.

The wherein selected component (i) or (ii) in some embodiments is soluble in non-aqueous drilling fluids and invert emulsion drilling fluids containing $C_7$ to $C_{20}$ olefins, esters, paraffinic oils and blends thereof, and also soluble in diesel and mineral oils and blends thereof with $C_7$ to $C_{20}$ olefins, esters, and paraffinic oils. The treatment formulation may further contain additives to initiate and control time of polymerization selected from: an acidic or acid-generating additive to initiate polymerization of the reactive component of (i)—a free-radical generating additive to initiate polymerization of the reactive component of (ii). Optionally a reaction retarder or polymerization inhibitor to delay the onset of polymerization until completion of injection into the formation has been completed.

The treatment formulation may, in some embodiments, also contain other additives, for example, selected from one or more of a) coupling agents; b) suspending agents; c) dyes; d) weighting agents; e) lost circulation materials; (f) tracers and g) other additives known in the art, or any combination thereof. The formulation, including amounts of each component, the type of acrylate/methacrylate monomer, and the chemical composition and material properties of the thermoplastic elastomer may be varied to provide the required material properties for the geosynthetic composite formed in-situ by chemical treatment.

The method of the present invention includes other chemical treatment formulations, and in particular, polymerization treatments where monomers, oligomers, or dissolved polymers are placed in the formation surrounding the wellbore to, for example, decrease porosity and/or permeability, or increase strength of the formation to enable continued drilling with reduced numbers of casing strings being placed in the wellbore.

In another embodiment, the invention may be characterized as an apparatus for applying the described method with minimal handling of chemicals which is an automated in-line chemical metering and pumping apparatus that requires no large mixing tank which includes:

1) A closed and sealed in-line mixing chamber having means for regulating flow of wellbore liquids, such as drilling fluid, completion fluid, packer fluid into said chamber;
2. Said means for regulating flow including a valve, an adjustable valve or orifice, wellbore fluids, and flowmeter with feedback mechanism for regulating fluid flow of said wellbore liquid into said in-line mixing chamber;
3. A plurality of vessels containing chemical components, each in fluid connection with the mixing vessel by means of a hose or line, wherein each hose or line from the vessel containing a chemical component to the in-line mixing chamber includes a pump and a flow meter, both in communication with computer controls; and
4. Wherein said in-line mixing chamber is in fluid communication with a pump and wherein said in-line mixing chamber combines chemical components with wellbore fluids prior to injection into the geologic formation. It is also within the scope of the invention for the chemical treatment compounds to be pumped separately, without being mixed with the wellbore fluids.

BRIEF DESCRIPTION OF THE DRAWINGS

FIG. 2 is a schematic drawing showing an alternative position for component lines.

FIG. 3 is a plot of filtration rate versus time.

DETAILED DESCRIPTION OF THE INVENTION

Figure 1:
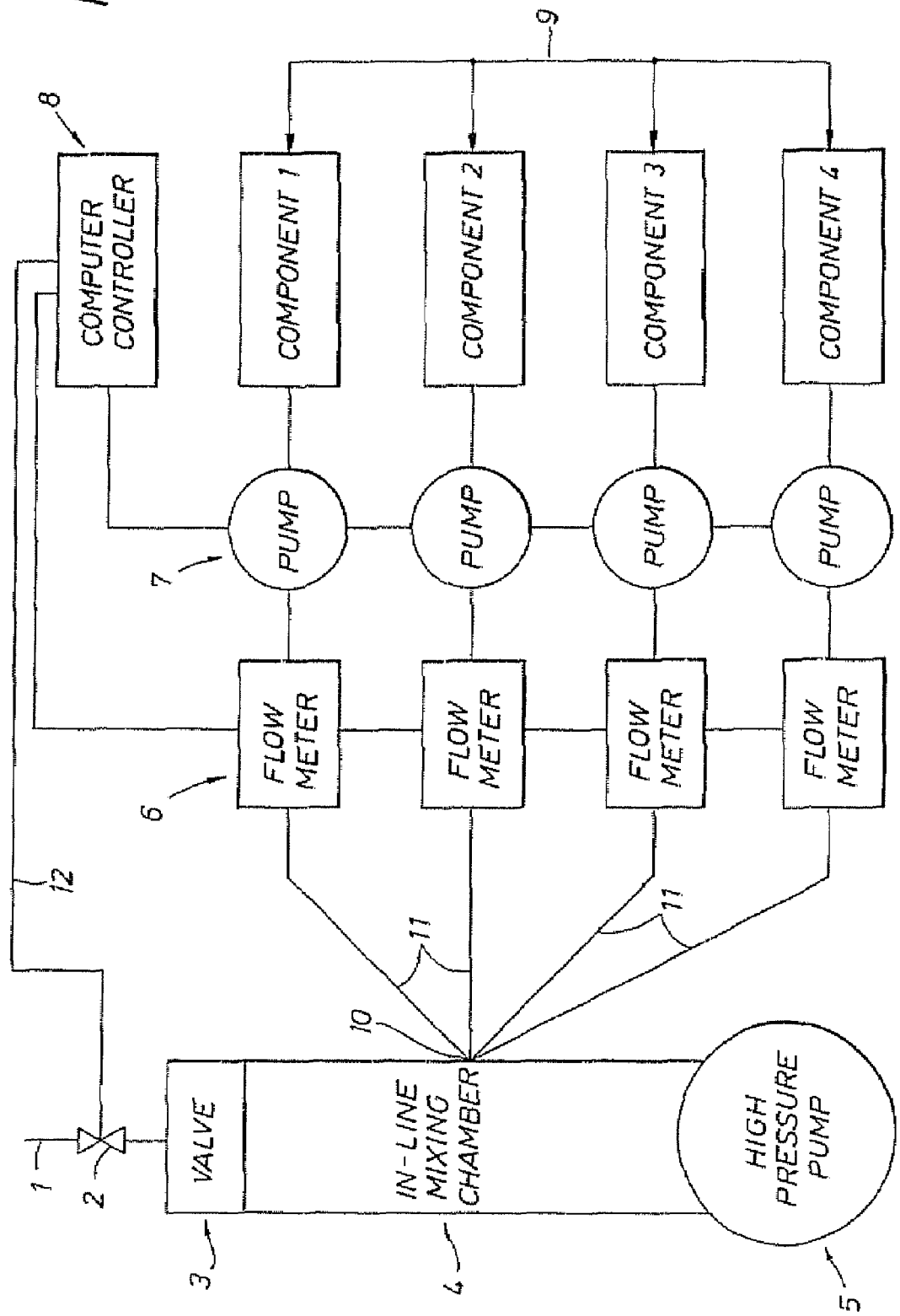
FIG. 1 is a schematic drawing of the in-line apparatus for mixing and pumping the chemical treatment formulations in the present invention.

The present invention provides a method and apparatus for utilization of the chemical formulation of co-pending U.S. Patent Application Ser. Nos. 60/576,430 and 60/576,440 (herein incorporated by reference) although other formulations may be useful and use of other formulations are intended to be within the scope of the present invention. The invention provides a method of selecting and applying a chemical formulation to strengthen the material properties of the geological formation encountered and to create geosynthetic rock-plastic composites in-situ. The chemical treatments to line the wellbore and create a geosynthetic composite casing in the earth extending radially from the wellbore make it possible to eliminate borehole diameter reductions necessitated by isolating geologic formations of significantly different properties with steel casings cemented into the earth at required intervals. This may make it possible to reduce the number of casing strings required to create a borehole of a specified depth in the earth. In some embodiments of the present invention, the method of this invention permits the creation of a single diameter or monobore wellbore lined with a single casing, or no more than two casing strings after reaching the required depth.

The first step in the method may be to determine or estimate the material properties of the exposed geological formation. An exposed geological formation as used herein is meant to include earth formations through which wellbores have been drilled, and a face of the formation is exposed to the open wellbore. Certain properties are assessed in order to select the proper treatment. These properties include, for example, fracture initiation pressure, tensile strength, Young's modulus and Poisson Ratio, temperature, porosity and permeability. Methods of obtaining this data are known to those skilled in the art and the invention is not intended to be limited to any particular methods of performing tests to determine these properties.

Once properties of the formation are determined, data may be obtained and analyzed to determine the required changes in material properties of the exposed geological formation that would be desirable to, for example, eliminate the need for setting an additional casing string. Given the changes desired the appropriate chemical formulation of the treatment may be selected, the necessary minimum radial penetration distance of the chemical treatment from the wellbore may be determined, and volume of chemical treatment may be determined The treatment process creates a cylindrical shell of a geosynthetic composite extending radially from the wellbore. Elastic modulus, tensile strength, compressive strength, fracture strength, fracture toughness and permeability of this geosynthetic composite are different from the surrounding formation. These properties allow the chemically treated region of the formation to withstand higher stresses (pressure) in the wellbore than the untreated formation without fracturing. The fracture pressure of the chemically treated region is higher than the untreated formation. The permeability of the chemically treated region is typically lower that the untreated formation.

The increased fracture pressure may be a function of the material properties of the geosynthetic composite and thickness of the treatment. The change in fracture initiation pressure can be estimated by equations, known in the art of mechanics, specifically rock mechanics, for calculating the fracture strength of formations. The impermeability of the geosynthetic composite is important in the change of fracture initiation pressure. The impermeable, treated portion of the formation acts as an elastic layer re-distributing the pressure applied to the wellbore to the surrounding formation, allowing higher stresses (pressures) to be applied before fracturing or failure of the wellbore occurs. Three modes of failure are possible with the impermeable, geosynthetic composite layer created by treatment of the formation: (a) fracture of the geosynthetic composite, (b) fracture of the untreated formation beyond the thickness of the geosyntetic composite, or (c) plastic failure of the geosynthetic composite. With some modes of failure, the impermeability of the layer is of critical importance and the thickness of the layer is of little importance except for the thickness required to obtain complete impermeability. In other modes of failure, thickness of the layer is of critical importance. Those skilled in the art of geomechanics will be able to use strength of materials principles to calculate the most likely mode of failure and required thickness of a layer to obtain a specific increase in fracture initiation pressure.

The volume of treatment is determined from radial penetration distance from the wellbore, length of interval, wellbore diameter and formation porosity. The volume of the cylindrical shell is calculated and multiplied by the porosity of the formation to estimate the volume of pore space to be filled with the chemical treatment. An excess volume may be added to compensate for the uncertainty in the estimation. The volume of the wellbore over the treated interval must be filled with chemical treatment before or during injection. This volume is also added to the formation treating volume and any excess to yield the required treating volume.

Permeability of the geologic formation to be treated is important. The formation must have sufficient permeability to allow the chemical treatment to flow into pores, displace pore fluids and bond particles of the formation together more strongly. It is desirable to treat formations having matrix permeabilities between 1 millidarcy and 50,000 millidarcy. Penetration rate typically increases with permeability at a constant injection pressure. The pressure required to inject the chemical treatment typically decreases with increasing permeability at a constant flow rate. Formations having permeability less than about 0.1 millidarcy are difficult to treat. Very low viscosity treating fluids, high injection pressures and long treatment times are required for low permeability formations. A practical solution for low permeability formations is to use a ductile, high strength material that requires a small radial penetration distance from the wellbore to achieve the desired increase in fracture pressure.

The amount of time required to perform the treatment is necessary for the formulation of the chemical treatment. The polymerization reaction should occur after injection of the treatment volume into the formation has been completed. However, the polymerization reaction should not occur too long after injection has been completed because dilution or flow-back or cross-flow of fluids within the wellbore is possible. Treatment time is estimated from the sum of time required to pump the chemical treatment into the wellbore adjacent to the geologic formation to be treated, the time required to inject the treatment into the formation, the time to retrieve or withdraw any treating tools or pipes from the treated interval plus a safety margin. Time required to pump the chemical treatment into the wellbore adjacent to the formation to be treated is calculated using the volume of the chemical treatement, the volume of the workstring, and the pump rate. The time required to inject chemical treatment volume into the formation can be calculated using the volume of the chemical to be injected and the filtration rate.

A pseudo-steady-state filtration rate can be determined from a filtration or fluid loss test using a formation core or a synthetic core having filtration properties representative of the geologic formation to be treated. FIG. 3 is an illustration of a filtration rate plot in which the pseudo-steady-state filtration rate can be determined. From the filtration rate, and the volume of formulation desired to be injected, the time needed to inject the formulation can be determined by the above equation. This time to inject the chemical treatment is preferably less than the time to cure the formulation used. Generally, the borehole is filled over the interval of the wellbore to be treated with the formulation, and then optionally pressurized to the extent desired to force the formulation into the formation without fracturing the formation. Thus the desired volume of the formulation can thereby be forced into the formation over the interval to be treated.

The chemical treatment may be selected based upon a number of considerations, an important one being compatibility with wellbore fluids (i.e. drilling fluids, completion fluids, formation fluids.) The chemical treatment should be compatible with or miscible with wellbore fluids and, most preferably the chemical treatment should be completely soluble in wellbore fluids. In addition, any catalyst or initiator should be compatible with wellbore fluids. For example, in a fluid containing a high amount of acid soluble or acid neutralizing components, one should not use an acid catalyzed chemical treatment fluid. In addition, the selected chemical treatment should be capable of penetrating drilling fluid filter cake or near-wellbore formation damage, commonly referred to as skin.

Additional important factors to consider when selecting the chemical treatment are strength and material properties of the chemical treatment, viscosity of the chemical treatment, initiation or catalyzation type of chemical treatment, wellbore temperature, required placement time of chemical treatment into geological formation, and permeability, porosity, and lithology of the geological formation.

In practice, the thickness of the treated formation (geosynthetic composite) is greater than the minimum thickness required to achieve a desired increase in formation fracture initiation pressure, or other property being improved or altered by the practice of the present invention. This is done because of the inhomogeneity of the formation and any variability in the injection process. As a result, the geological formation is treated to improve/increase material property values to the required levels by injecting a chemical treatment into the formation to create a geosynthetic composite extending 0.05 to 5 meters, preferably 0.1 to 3 meters, most preferably 0.25 to 2 meters radially from the borehole. The chemical treatment type and the depth of penetration are interrelated and should be determined based upon the geologic formation type; the permeability and porosity of the untreated formation; the presence of natural or induced fractures, fissures, faults or vugs; and the required material properties of the geosynthetic composite to be formed in-situ by the chemical treatment. Less radial penetration may by required in strong formations or when using high strength chemical treatments. Deeper radial penetration may be required for weak or unconsolidated formations and/or lower strength chemical treatments.

The chemical treatment, referred to above and described in detail in co-pending U.S. Patent Application Ser. Nos. 60/576,430 and 60/576,440, comprises various formulations of claimed components useful for creating geosynthetic composites in-situ, including: at least one reactive, polymerizable component selected from:

(i) At least one melamine-formaldehyde resin, or a blend of suitable melamine-formaldehyde resins; optionally blended with a polyol and/or a poly(hydroxy)ether, or blend thereof; or (ii) A blend of a reactive ester, or blend of esters, having at least one carbon-carbon double bond, preferably comprising a vinyl ester of a $C_9$ to $C_{11}$ versatic acid or a vinyl ester of a long chain fatty acid, or blends thereof; an unsaturated thermoplastic elastomer having at least one carbon-carbon double bond soluble in the reactive vinyl ester; a di- or tri-functional acrylate or methacrylate monomer; and optionally a thermoplastic elastomer with or without pendant functional groups.

Selected component (i) or (ii) is preferably soluble in non-aqueous drilling fluids and invert emulsion drilling fluids containing $C_7$ to $C_{20}$ olefins, esters, paraffinic oils and blends thereof, and also soluble in diesel and mineral oils and blends thereof with $C_7$ to $C_{20}$ olefins, esters, and paraffinic oils. The treatment may further contain additives to initiate and control time of polymerization selected from: an acidic or acid-generating additive to initiate polymerization of the reactive component of i); or a free-radical generating additive to initiate polymerization of the reactive component of (ii). Optionally a reaction retarder or polymerization inhibitor to delay the onset of polymerization until completion of injection into the formation has been completed.

The treatment optionally contains other additives selected from one or more of, for example, a) coupling agents; b) suspending agents; c) dyes; d) weighting agents; e) lost circulation materials; f) tracers and g) other additives known in the art, or any combination thereof. The formulation, including amounts of each component, the type of acrylate/methacrylate monomer, and the chemical composition and material properties of the thermoplastic elastomer may be varied to provide the required material properties for the geosynthetic composite formed in-situ by chemical treatment.

The selected formulation of the invention hardens in the pores of the formation, bonds formation particles together, and forms a rock-plastic composite. The treatment is suitable for application to increase near-wellbore fracture initiation pressure, in depleted zones, over-pressured zones, flow zones, lost circulation zones and in other applications that will be apparent to those skilled in the art.

The melamine-formaldehyde component in the formulation is a liquid melamine-formaldehyde resin that is soluble in any hydrocarbon blend selected from one or more of a non-aqueous drilling fluid, an invert emulsion drilling fluid, diesel oil, mineral oil, and any blend of these with a $C_7$ to $C_{20}$ olefin, esters, and paraffin oils, and combinations thereof.

Suitable melamine-formaldehyde resins are amino crosslinkers designed for thermosetting surface coatings. Suitable resins should be capable of functioning to crosslink the molecules of the primary film former in a coating to form a three-dimensional thermoset polymer network, which involves the reaction of the functional groups on the amino with complementary reactive groups on the primary film former. Suitable resins are solvent soluble and contain water extendable melamine. Suitable resins exhibit a versatile catalyzed cure response in a range between about 100° F. to over 600° F., more often between about 150° F. and 350° F. and provide good film flexibility and toughness. Resins are selected for the formulation based on a combination of performance and cure parameters depending on the properties of the formation to be treated.

The melamine-formaldehyde resin or blend of suitable melamine-formaldehyde resins may optionally also be blended with a polyol. Suitable polyols must be soluble in the melamine-formaldehyde resin or blend of melamine-formaldehyde resins, and also soluble in the hydrocarbon phase of drilling/completion fluids. Suitable polyols include, for example, but are not limited to ethylene glycol, propylene glycol, diethylene glycol, triethylene glycol, polyethylene glycol, polypropylene glycol, glycerol and polyethylene-propylene glycol. A suitable amount of polyol is from 0 to 50% by volume, more preferably 5 to 35% by volume, and most preferably 10 to 30% by volume of the formulation. Suitable polyols for use in the present invention are sold commercially under the tradename Voranol Voractiv™ Polyols by Dow Chemical Company.

The melamine-formaldehyde resin or blend of melamine-formaldehyde resins may also optionally be blended with a poly (hydroxy) ether. Suitable poly (hydroxy) ether material must be soluble in the melamine-formaldehyde resin or blend of melamine-formaldehyde resins, and also in the hydrocarbon phase of drilling/completion fluids. Suitable poly (hydroxy) ethers include those that are high molecular weight with preferably a predominantly linear structure, which typically provides a combination of toughness and flexibility, and characterized by ether linkages and pendant hydroxyl groups that promote wetting and bonding to polar substrates and fillers.

Blends of suitable poly (hydroxy) ethers may also be employed. A suitable amount of poly (hydroxy) ether is in the range of from 0 to 50% by volume, more preferably 5 to 35% by volume, and most preferably 10 to 30% by volume of the formulation. It is also within the scope of the invention to utilize as the reactive component a suitable melamine-formaldehyde resin, or blend of resins, blended with a polyol, or blend of suitable polyols, and a poly (hydroxy) ether or blend of suitable poly (hydroxy) ethers.

The alternative choice for the reactive monomer/resin is actually a blend of: 1) a reactive ester, or blend of esters, having at least one carbon-carbon double bond, preferably comprising a vinyl ester of a $C_9$ to $C_{11}$ versatic acid or a vinyl ester of a long chain fatty acid, or blends thereof, 2) an unsaturated thermoplastic elastomer soluble in the reactive ester, and 3) a di- or tri-functional acrylate or methacrylate monomer. Optionally to this blend can be added: 4) a saturated thermoplastic elastomer with or without pendant functional groups.

In the blend of the alternative reactive monomer/resin, suitable reactive esters are selected from the group consisting of vinyl esters of $C_9$ to $C_{11}$ versatic acids or vinyl esters of long chain fatty acids, or blends thereof. Preferred vinyl esters of versatic acids for use in the present invention are the vinyl esters of $C_{10}$ versatic acids. Though vinyl esters of $C_9$ to $C_{11}$ versatic acids are suitable, the vinyl esters of $C_{11}$ versatic acids tend to be soft for most requirements in the practice of the present invention. In addition, although vinyl esters of $C_9$ versatic acids are more rigid and suitable for applications in the present invention, in practicality the vinyl esters of $C_9$ and $C_{11}$ versatic acids are not widely available and are much more expensive than the vinyl esters of $C_{10}$ versatic acids. Suitable vinyl esters of $C_9$ to $C_{11}$ versatic acids are available from Resolution Performance Products under the tradename VEOVA™, including, but not limited to, VEOVA-9, VEOVA-10, and VEOVA-11. VEOVA-10 is preferred. VEOVA-10 was employed in the examples with good results and is vinyl neodecanoate, which is the vinyl ester of a highly branched, $C_{10}$ monocarboxylic acid.

Suitable vinyl esters of long-chain fatty acids include, inter alia, vinyl pelargonate, vinyl stearate, vinyl laurate, and the like. The esters may be utilized individually or as a blend of esters. It is also within the scope of the invention to utilize a blend of vinyl esters of $C_9$ to $C_{11}$ versatic acids with vinyl esters of long-chain fatty acids. The amount of vinyl ester or blend thereof, or melamine-formaldehyde resin, or blend thereof, in the present invention should be in the range of 10 to 90 wt percent, preferably 35 to 70 wt percent.

In the alternative formulation for reactive monomer/resin suitable unsaturated thermoplastic elastomers blended into the formulation comprise linear, radial, or star configuration di- or tri-block polymer(s) having at least one unsaturated carbon-carbon bond. Suitable examples include, but are not limited to di- or tri-polymers comprising styrene-butadiene-styrene (SBS) or styrene-isoprene-styrene (SIS). Suitable unsaturated thermoplastic elastomers are available commercially under the tradename Kraton® from Kraton Polymer, particularly the Kraton® D series. Specific examples include, but are not limited to, Kraton® 1101, Kraton® 1112, Kraton® 1122X, Kraton® 1161, Kraton® 1184 and Kraton® D-1401P. The unsaturated thermoplastic elastomer is selected based upon polymer shape (i.e. linear, radial, or star), end group (styrene-isoprene-styrene block polymers, etc.), tensile strength, 300% modulus, and elongation percent at failure and solution viscosity in the vinyl ester or vinyl ester blend. Styrene-to-rubber ratios should range between 15:85 to 75:25. Tensile strength of the unsaturated thermoplastic elastomers should be greater than 1000 psi (measured according to ASTM Method D412) and possess a percent elongation at failure of at least 300 percent (measured according to ASTM Method D412). A blend of suitable unsaturated thermoplastic elastomers may also be employed. The amount of unsaturated thermoplastic elastomer, or blend thereof, present in the composition should be in the range of 1 to 30 wt percent, more preferably between 2.5 and 25 wt percent, and most preferably between 5 and 20 wt percent.

In the blend of the alternate monomer/resin suitable acrylate or methacrylate monomers for the blend are selected from the group having di- or tri-functional unsaturated, reactive groups. Examples include, but are not limited to ethylene glycol diacrylate or dimethacrylate, tripropylene glycol diacrylate or dimethacrylate, and trimethylolpropane trimethacrylate, polyethylene glycol diacrylate or methacrylate, propylene glycol diacrylate or dimethacrylate individually, or blends thereof. The amount of acrylate or methacrylate monomer present in the formulation should be in the range between 0 and 65 wt percent, more preferably 2.5 to 50 wt percent, and most preferably between 5 and 35 wt percent.

A saturated thermoplastic elastomer can optionally be incorporated into the alternative monomer/resin to control viscosity and provide suspension for solids. The saturated thermoplastic may be selected from those that are linear, diblock, radial or star-shaped (molecular shape), or functionalized saturated thermoplastic rubbers. Suitable saturated thermoplastic elastomers are available commercially under the tradename Kraton® from Kraton Polymer, particularly the Kraton® G Series and Kraton® FG Series. Suitable examples of radial or star molecularly shaped saturated thermoplastic rubber include, but are not limited to Kraton® G-1650, Kraton® G-1657, Kraton® G-1701, Kraton® G-1702, Kraton® G-1750X, Kraton® G-1765X, Kraton® G-1780X, Kraton® FG-1901 and Kraton® FG-1924X.

Where functionalized saturated thermoplastic rubbers are incorporated, the functional groups can be hydroxyl, carboxyl, or maleic acid. Maleic acid/maleic anhydride functionalities incorporated into the molecular composition of the saturated thermoplastic elastomer provide crosslinking sites to alter material properties of the cured formulation. A suitable amount of saturated, thermoplastic elastomer, or blend thereof, is in the range of about 1 to 15 wt percent. The preferred saturated, thermoplastic elastomers for use in the present invention are selected from the radial or star saturated thermoplastic polymers.

As mentioned above a saturated thermoplastic elastomer with or without pendant functional groups can optionally be added to the formulation including the unsaturated thermoplastic elastomer. Therefore, it is within the scope of the invention to utilize blends of unsaturated thermoplastic elastomers and saturated thermoplastic elastomers, such as, for example, blending the Kraton D series and Kraton G series. Furthermore, it is within the scope of the invention to blend unsaturated thermoplastic elastomers with functionalized elastomers, such as, for example, blending the Kraton D series and Kraton FG series, as well as utilizing blends of saturated, unsaturated and functionalized thermoplastic elastomers or respective Kraton series product.

A solvent may be employed to dilute the blend of the selected formulation, improve wetting of formation surfaces, and improve tolerance to water contamination. The solvent should be miscible with water and hydrocarbons and may be selected from any convenient type, which would be apparent to those skilled in the art. Suitable solvents include, but are not limited to low molecular weight anhydrous alcohols such as methanol, ethanol, propanols; ethers and polyethers such as tetrahydrofuran, dioxane, ethylene glycol monoalkyl ethers, polyethyleneglycol monoalkylethers or glycol ether esters; ether alcohols such as 2-butoxyethanol. Preferred solvents include ethylene glycol monobutyl ether, propylene glycol methyl ether acetate, and other solvents effective for dissolving the thermoplastic elastomer, or combinations thereof. A suitable concentration of mutual solvent can range from 0 to 50 wt percent, more preferably 1 to 35 wt percent, and most preferably 5 to 25 wt percent.

A catalyst or initiator is useful in the application of the present invention. The use of catalysts and initiators is known in the art and the invention is not intended to be limited to any particular type. An acidic catalyst or acid-producing catalyst is suitable for condensation polymerization of melamine-formaldehyde resins.

Suitable free radical initiating catalysts or catalyst systems may include, for example, but not be limited to, azo compounds, alkyl or acyl peroxides or hydroperoxides, ketoperoxides, peroxy esters, peroxy carbonates and peroxy ketals. Such compounds vary with respect to activation temperature and half-life or, in other words, the temperature at which their reaction is initiated and becomes extensive. Examples of suitable alkyl peroxides, dialkyl peroxides, hydroperoxides, acyl peroxides, peroxy esters and peroxy ketals include, but are not limited to benzoyl peroxide, dibenzoyl peroxide, diacetyl peroxide, di-t-butyl peroxide, cumyl peroxide, dicumyl peroxide, dilauryl peroxide, t-butyl hydroperoxide, methyl ketone peroxide, acetylacetone peroxide, methylethyl ketone peroxide, dibutylperoxyl cyclohexane, di (2,4-dichlorobenzoyl) peroxide, diisobutyl peroxide, t-butyl perbenzoate, and t-butyl peracetate. The catalyst may be employed in total amounts from about 0.001 to about 20 weight percent based upon the weight of the polymerizable monomer.

Likewise an inhibitor may be required and the invention is not intended to be limited to any particular inhibitor. Those skilled in the art would recognize suitable inhibitors. Examples of suitable inhibitors for free radical polymerization reactions include, for example, benzoyl quinone, parabenzoquinone, and the like, which exhibit efficacy at elevated temperatures. Some inhibitors are not adequately effective at elevated temperatures. Additional examples of inhibitors include hydroquinones, such as, for example, methyl hydroquinone and methyl ethyl hydroquinone. Polyols, polyhydroxy ethers, alcohols and bases are inhibitors for acid-catalyzed condensation reactions. The quantity of inhibitor is adapted to the reactive, polymerizable prepolymer and monomer components in question, including the desired pot life and curing time. In general the inhibitor is present in a quantity from about 0.02 to 2 weight parts. The preferred quantity results in the proper exothermic process and short curing time.

A catalyst is preferably used, but an inhibitor is not always necessary. When the temperature in the well is elevated, say for example, higher than 150°, the reaction may go too fast. At that point the inhibitor is added, acts as a free radical scavenger, and prevents the polymerization from proceeding too fast. Eventually the inhibitor may be used up and the free radical, or acid groups, then initiates polymerization, which is subsequently self-sustaining. In some high temperature wells the inhibitor can only decrease the boiling point a limited amount and where the inhibitor has limited effectiveness there may be a negative impact on the molecular weight of the geosynthetic composite in that it is lower than would be optimally desirable.

Numerous coupling agents are known in the art and the invention is not intended to be limited to particular agents. A suitable concentration for a coupling agent is in the range of 0 to 10 wt percent.

Suspending agents known in the art can be added to the formulation to support solids. The invention is not intended to be limited to any particular agents, however suitable suspending agents include, for example, organophilic clays, amine treated clays, oil soluble polymers, quaternary ammonium compounds, polyamide resins, polycarboxylic acids, and soaps.

The formulation may also contain other common treatment fluid ingredients such as fluid loss control additives, dyes, anti-foaming agents when necessary and the like, employed in typical quantities, known to those skilled in the art. Of course, the addition of such other additives should be avoided if it will detrimentally affect the basic desired properties of the treatment fluid.

Weighting agents or density materials may be added to the formulation. Suitable materials include, for example, galena, hematite, magnetite, iron oxides, ilmenite, barite, siderite, celestite, dolomite, calcite, manganese oxides, magnesium oxide, zinc oxide, zirconium oxides, spinels and the like. The quantity of such material added, if any, depends upon the desired density of the chemical treatment composition. Typically, weight material is added to result in a drilling fluid density of up to about 9 pounds per gallon. The weighted material is preferably added up to 5 pounds per barrel and most preferably up to 500 pounds per barrel of resin blend.

Lost circulation materials may also be incorporated into the formulation. These materials are generally catagorized as fibers, flakes, granules, and mixtures. Specific examples include, but are not limited to, ground mica, mica flakes, silica slag, diatomaceous earth, hydrated borate, graded sand, gilsonite, ground coal, charcoal, cellophane flakes or strips, cellulose fiber, expanded perlite, shredded paper or paper pulp, and the like, walnut or other nut hulls ground to different sizes, cottonseed hulls or cottonseed bolls, sugar cane fibers or bagess, flax, straw, ground hemp, ground fir bark, ground redwood bark and fibers, and grape extraction residue, crystalline silicas, amorphous silicas, clays, calcium carbonate, and barite. Suitable amounts of additional solid agents for use in combination with the copolymer(s) and/or ionomer(s) would be apparent to those skilled in the art.

The formulation, containing either choice of reactive monomer, including amounts of each component, the type of acrylate/methacrylate monomer where used, and the chemical composition and material properties of the thermoplastic elastomer where used are varied to provide required material properties for geosynthetic composites formed in-situ.

The chemical treatment formulation of the present invention may be applied to the wellbore through the drill string (BHA); an open-ended treatment if a large LCM (lost circulation material) is used, by a spot-and-hesitation squeeze, or by a bullhead-and-hesitation squeeze (particularly in a severe loss zone). Preferably the composite will exhibit radial penetration away from the wellbore of 0.25 to 2m. The monomer/resin formulation hardens in the pores of the formation and bonds formation particles together to form a rock-plastic composite.

After treatment the material properties of the geosynthetic composite are improved over the untreated geological formation. The fracture initiation pressure is increased, tensile strength increased, Young's modulus and Poisson Ratio are favorably altered to improve formation ductility, fracture toughness, and compressive strength, and the permeability is reduced.

After a zone is treated it can be pressure tested and drilling can be resumed. It may be appropriate at this point to use a higher or lower mud weight, as will be apparent to those skilled in the art.

In the present invention components can be continuously mixed in an automated chemical metering and pumping system, which is represented by FIG. 1. With reference to FIG. 1, 1 represents a line bringing drilling fluid from the mud pits, 2 represents a flowmeter with a feedback mechanism 12 that is in communication with computer controls, 3 is a valve, 4 is an in-line mixing chamber, and 5 is a high pressure pump. The flowmeter and feedback mechanism permit automatic adjustment if flow from the mud pits is reduced. The various components, i.e. suitable melamine-formaldehydes, reactive ester(s) having at least one carbon-carbon double bond, unsaturated thermoplastic elastomers, di- or tri-functional acrylate or methacrylate monomer, polyol, poly (hydroxy) ether, etc. are stored in a plurality of component vessels represented by 9. Four are represented for illustration, but there may be any number as would be apparent to those skilled in the art. Each vessel 9 containing chemical components is in fluid communication with the in-line mixing vessel 4 by means of lines or hoses 11. At the point where the lines or hoses connect to the component vessels 9 there are preferably valves (not shown) so that if a hose is disconnected the operator effectively has an individually closed and uncontaminated source. These hoses would suitably be automatic quick connect hoses, known in the art. On each line or hose is situated a pump 7 and a flow meter 6. In addition, the pump 7 and flow meter 6 for each vessel is in communication with computer controls, represented by 8. Component inlet lines from each of the flow meters 6 flow into the in-line mixing vessel at point 10. The component inlet lines can all enter the mixing section at one point as shown in FIG. 1, or they can enter at separate points as shown in FIG. 2.

Various components can be mixed in the enclosed, in-line mixing device 4 prior to pumping into a well. The pump 5 used to inject the chemical mixture into the well may be part of the drilling/workover rig. It is also within the scope of the invention that the pump used to inject the chemical mixture into the well may be a specialized high pressure pump, such as a cement pump or stimulation pump that is not an integral part of the drilling/workover rig.

The process could be run manually, but is preferably computer controlled and automated to accurately inject and combine all components in variable, user-selected ratios, depending upon the chemical formulation. Suitable types of computer controls would be known to those skilled in the art. For example, a process loop control system would be suitable. The in-line mixer and computer controlled system is an improvement because many chemical treatments for use in boreholes often utilize chemicals that are toxic to humans and to the environment. Exposure to chemicals sometimes occurs during mixing in open tanks. Also, many mixing tanks have a 'dead space volume' that cannot be drained during the treatment. This excess volume must be disposed of along with the fluids used to clean the tank after use that are contaminated with the toxic chemical mixture. Thus, the method of the present invention eliminates the need for mixing tanks, cleaning mixing tanks and reducing waste fluids that must be disposed of after the treatment has been performed. The method improves safety, reduces environmental requirements for waste disposal, and reduces exposure of personnel to hazardous chemicals. HSE issues are greatly reduced. The method may be applied to mixtures of chemical treating materials with drilling/completion fluids or the chemical treating fluid alone.

Advantages of the present invention include the following:
1. Improved logistics: Essential materials and additives can be stored on location in the original form with no need to premix materials at a remote distribution facility and transport them out to the well site prior to each job.
2. Reduce/eliminate holding volume: There is no need to combine an essential material with one or more other essential materials or additives in a large holding volume prior to the job. This is particularly important in offshore applications.
3. Time savings: The slurry design can be adjusted and modified right up to the time for the slurry to be mixed and pumped. Immediate turnaround can be achieved (i.e., a desired slurry can be quickly produced in the correct proportions at the time it is needed).
4. Accuracy: Since there is no required premixing, homogeneity can be maintained. Additionally, accurate concentrations of the additives, also critical to the delivery of high quality jobs, can be maintained.
5. Reduced waste: A slurry can be made on an as needed basis so that large volumes of treated materials, which might ultimately not be used, do not need to be made in advance.

The following examples will serve to illustrate the invention disclosed herein. The examples are intended only as a means of illustration and should not be construed as limiting the scope of the invention in any way. Those skilled in the art will recognize many variations that may be made without departing from the spirit of the disclosed invention.

EXAMPLES 1-3

Examples 1 through 3 demonstrate the use in the field of the formulation utilizing at least one melamine-formaldehyde resin, or a blend of melamine-formaldehyde resins, optionally blended with a polyol and/or poly (hydroxy) ether, soluble in non-aqueous drilling fluids and invert emulsion drilling fluids containing $C_7$ to $C_{20}$ olefins, esters, paraffinic oils and blends thereof, and also soluble in diesel and mineral oils and blends thereof with $C_7$ to $C_{20}$ olefins, esters, and paraffinic oils; and optionally other additives selected from one or more of coupling agents, suspending agents, dyes, weighting agents, lost circulation materials, and other additives known in the art.

Example 1

Multiple treatments were performed in seven wells having uncased wellbore intervals between the depths of about 9,000 feet and about 18,000 feet, in a southern Texas gas field. Static geothermal temperatures between about 235 to 320° F. were encountered in this depth range. Multiple geologic formations are exposed within this depth interval in these wells. A series of permeable sandstone formations separated by shale and silt intervals generally describes the exposed formations in the wellbore. Hydrocarbons, primarily gas, from some of the exposed sands have been produced from other wells in the field. Production has decreased the formation pore pressure of these formations and reduced their fracture initiation and propagation pressure. Other exposed, permeable, hydrocarbon-bearing sands have not been produced and are at their original formation pore pressure and corresponding higher fracture initiation and propagation pressures. In some cases the drilling fluid weight necessary to balance the pore pressure of unproduced formations exceeds the fracture initiation and propagation pressure of previously produced formations. Normally, casings are run and cemented in the wellbore to isolate geologic formations with such differences in pressure and strength.

Failure to isolate formations with these differences in pressure and properties generally leads to fracturing of the weaker formation causing lost circulation. If the lost circulation cannot be cured or controlled, then uncontrolled flow of hydrocarbons (or other fluids under pressure) can occur between formations or to the surface. Such uncontrolled flow from a wellbore is referred to in the art as a blowout. In Well No. 1 of this study, the weaker formation was fractured by the higher mud weight required to control the pore pressure from a previously unproduced formation. Depth of the lost circulation zone was at approximately 12,000 feet, which was 3,000 feet deeper than the shoe of the previous casing string. Lost circulation was severe and difficult to control. A resin-based lost circulation treatment was performed to repair the fractured formation. The formulation used for this treatment was:

Per finished (42 gallon) barrel of fluid:

| | |
|---|---|
| 13.4 gallons | Diesel oil invert drilling fluid (16.7 lb/gal) |
| 16.8 gallons | Resimene 755 Melamine-Formaldehyde Resin |
| 4.2 gallons | Ethylene glycol monobutyl ether |
| 323.6 pounds | Hematite |
| 3.06 pounds | Para-toluene sulfonic acid catalyst (40% by weight in isopropyl alcohol) |
| 10 pounds | Magma Fiber Regular (Large fiber lost circulation material) |
| 5 pounds | Magma Fiber Fine (Small fiber lost circulation material) |

The original drilling fluid weight was 16.7 lb/gal. Addition of the melamine-formaldehyde resin, ethylene glycol monobutyl ether solvent and catalyst reduced the solution weight. Hematite (iron oxide) was added as a weighting agent to increase the weight of the final mixture back to 16.7 lb/gal.

The treatment was performed as follows:
1. Pull end of drill string up to 9,000 feet just inside the shoe of the previous 9⅝ inch casing string.
2. Pump 50 bbls of resin mixture (formulation above) down the drillpipe to a depth where the leading edge of the mixture is 10 bbls above the end of the drill string.
Note: No spacer fluids were required ahead of or behind the resin mixture to separate the treatment fluid from the drilling fluid in the wellbore. This is because the resin is completely soluble in the drilling fluid and was combined with the drilling fluid to make the treatment mixture. The mutual solvent was included in this first formulation to insure complete compatibility between the drilling fluid and resin mixture. However, the solvent was omitted from later jobs due to complete compatibility of the resin with the drilling fluid and the lack of water in most formations being treated.
3. Close in the annular blowout preventer to stop circulation of fluid out of the well and prepare to squeeze the resin treatment into the lost circulation zone.
4. Squeeze the 50 bbls of resin mixture containing lost circulation material into the loss zone by pumping drilling fluid down the drill pipe to displace the resin mixture out of the pipe into the formation.
5. Once all the resin mixture has been displaced from the drill pipe, pump an additional 10 bbls of fluid down the drill pipe to displace the trailing edge of the resin mixture to a depth below the end of the drill pipe but above the top of the lost circulation zone.
6. Pump an additional 10 bbls of displacement down the annulus to complete displacement of the trailing edge of the resin mixture to just above the top of the lost circulation zone.
7. Allow the well to remain shut-in for 8 hours prior to resuming drilling operations.

This treatment did not completely cure the lost circulation. However, it did seal off exposed high-pressure zones that were flowing gas into the wellbore. Therefore, the risk of loss of well control was accomplished by reducing the losses and sealing off the flow zones. No other treatment of this troublesome interval was required.

Example 2

In Well No. 2 of this study, an exposed lower pressure (depleted) formation was fractured by a high drilling fluid weight required to control an exposed high-pressure zone. This caused lost circulation and prevented further drilling operations to deepen the wellbore. A resin-based lost circulation treatment was performed to repair the fractured formation. The formulation used for this treatment was:

Per finished (42 gallon) barrel of fluid:

| | | |
|---|---|---|
| 13.4 | gallons | Diesel oil invert drilling fluid (16.8 lb/gal) |
| 16.8 | gallons | Resimene 755 Melamine-Formaldehyde Resin |
| 4.2 | gallons | Ethylene glycol monobutyl ether |
| 328.3 | pounds | Hematite |
| 7.65 | pounds | Formic acid catalyst (88%) |
| 5 | pounds | Magma Fiber Regular (Large fiber lost circulation material) |
| 5 | pounds | Magma Fiber Fine (Small fiber lost circulation material) |

The original drilling fluid weight was 16.8 lb/gal. Addition of the melamine-formaldehyde resin, ethylene glycol monobutyl ether solvent and catalyst reduced the solution weight. Hematite (iron oxide) was added as a weighting agent to increase the weight of the final mixture back to 16.8 lb/gal.

Treatment was performed using the following procedure:
1. Pull end of drill string up to 300 feet above the lost circulation zone.
2. Pump 35 bbls of resin mixture (formulation above) down the drillpipe to a depth where the leading edge of the mixture is 10 bbls above the end of the drill string.
Note: No spacer fluids were required ahead of or behind the resin mixture to separate the treatment fluid from the drilling fluid in the wellbore.
3. Close in the annular blowout preventer to stop circulation of fluid out of the well and prepare to squeeze the resin treatment into the lost circulation zone.
4. Squeeze the 35 bbls of resin mixture containing lost circulation material into the loss zone by pumping drilling fluid down the drill pipe to displace the resin mixture out of the pipe into the formation.
5. Displace the trailing edge of the resin mixture to a point 100 feet above the top of the lost circulation zone.
6. Allow the well to remain shut-in for 8 hours prior to resuming drilling operations.

After the treatment, the drilling fluid weight was increased to 17.2 lb/gal and the wellbore was deepened to its target total depth with no lost circulation.

Example 3

Well No. 3 utilized resin treatments to strengthen a formation prior to inducing lost circulation. In this well, a resin treatment was pumped to cure a lost circulation zone and seal off a high-pressure flow zone at shallower depths. Sealing off the flow zone allowed a lower drilling fluid weight to be used to drill deeper. The lower mud weight allowed a weaker formation at a deeper depth to be drilled-through without fracturing the formation and inducing lost circulation.

After drilling through the weaker formation at the deeper depth, the weak formation was treated with a resin mixture to strengthen it and increase its near-wellbore fracture initiation pressure. The following mixture was used:

Per finished (42 gallon) barrel of fluid

| | | |
|---|---|---|
| 20.5 | gallons | Diesel oil invert drilling fluid (16.0 lb/gal) |
| 16.8 | gallons | Resimene 755 Melamine Formaldehyde Resin |
| 161 | pounds | Hematite |
| 7.65 | pounds | Para-toluene sulfonic acid catalyst (40% by weight in isopropyl alcohol) |

A spot-and-squeeze technique was used for this treatment. The procedure follows:
1. Run drillstring and tag total depth. Total depth of the wellbore was approximately 100 feet below the bottom of the weak interval to be treated. The weak formation was approximately 150 feet thick.
2. Pull up drillstring 50 feet above total depth.
3. Spot 30 bbls of the resin mixture across and extending above the top of the weak formation. The column length of the resin mixture was approximately 400 ft. Excess volume was spotted to allow a volume of the resin to be injected into the matrix of the formation.

Spotting the fluid is accomplished by pumping the resin mixture into the drill string, pumping a fluid (typically the drilling fluid) behind to displace the resin mixture out the end of the drill string and out into the annulus between the wellbore and drill string. The annulus is open at the surface to allow fluid to be circulated out of the wellbore as the resin mixture is placed.

4. After spotting the resin mixture in the wellbore, the drill string was pulled up to the previous casing shoe.
5. The annular blowout preventer was closed.
6. Fluid was pumped down the drill string to squeeze the resin into the weak formation.
7. Radial penetration of the resin into the wellbore could be calculated from the volume of fluid squeezed into the formation, formation porosity, formation thickness (height) and wellbore diameter. Calculated radial penetration distance for the resin in this treatment was 0.6 m (1.9 feet).
8. After squeezing resin into the formation, the well was shut in for 6 hours prior to cleaning set resin out of the wellbore and resuming drilling operations to deepen the well.

The drilling fluid weight was increased to over 17 lb/gal during drilling operations to total depth and no lost circulation occurred. The resin treatment effectively strengthened the formation near the wellbore.

The process described above for Well No. 3 in this test study was repeated in four more wells with similar, successful results.

EXAMPLES 4-10

Examples 4 through 20 demonstrate the preparation of various formulations and include the generic description and percent weight of each component. Veova™ is the tradename for $C_9$ to $C_{11}$ versatic acids available from Resolution Performance Products. Kraton® is the tradename for saturated thermoplastic elastomers available commercially from Kraton® Polymer. Resimene® is the tradename for melamine-formaldehyde resins, which can be obtained commercially from Solutia, Inc. CYMEL® is the tradename for melamine-formaldehyde resins commercially available from Cytec Industries. These compositions are each useful in some embodiments of the present invention and represent a range of different resulting properties of the cured materials.

Example 4

| Component | Description/Function | Amount % weight |
|---|---|---|
| Veova - 10 Monomer | Vinyl Ester of Neodecanoic Acid | 65 |
| Trimethylolpropane trimethacrylate | Tri-functional acrylate monomer/crosslinker | 15 |
| Ethylene glycol monobutyl ether | Mutual solvent | 7.5 |
| Kraton D-1122X | Unsaturated, radial-shape thermoplastic elastomer | 10 |
| Kraton G-1780M | Saturated, star-shaped, thermoplastic elastomer | 2.5 |
| Total | | 100 |

Example 5

| | | |
|---|---|---|
| Veova - 10 Monomer | Vinyl Ester of Neodecanoic Acid | 80 |
| Lauryl methacrylate | Monofunctional acrylate monomer | 0 |
| Trimethylolpropane trimethacrylate | Tri-functional acrylate monomer/crosslinker | 10 |

Example 5-continued

| | | |
|---|---|---|
| Ethylene glycol monobutyl ether | Mutual solvent | 0 |
| Kraton D-1122X | Unsaturated, radial-shape thermoplastic elastomer | 10 |
| Total | | 100 |

Example 6

| | | |
|---|---|---|
| Veova - 10 Monomer | Vinyl Ester of Neodecanoic Acid | 70 |
| Lauryl methacrylate | Monofunctional acrylate monomer | 0 |
| Tripropylene glycol diacrylate | Di-functional acrylate monomer/crosslinker | 15 |
| Ethylene glycol monobutyl ether | Mutual solvent | 5 |
| Kraton D-1122X | Unsaturated, radial-shape thermoplastic elastomer | 10 |
| Total | | 100 |

Example 7

| | | |
|---|---|---|
| Veova - 10 Monomer | Vinyl Ester of Neodecanoic Acid | 70 |
| Lauryl methacrylate | Monofunctional acrylate monomer | 0 |
| Resimene 755 | Butylated amino resin crosslinker | 20 |
| Ethylene glycol monobutyl ether | Mutual solvent | 0 |
| Kraton D-1122X | Unsaturated, radial-shape thermoplastic elastomer | 10 |
| Total | | 100 |

Example 8

| | | |
|---|---|---|
| Veova - 10 Monomer | Vinyl Ester of Neodecanoic Acid | 80 |
| Lauryl methacrylate | Monofunctional acrylate monomer | 0 |
| Resimene CE-6550 | Co-etherified amino resin crosslinker | 10 |
| Ethylene glycol monobutyl ether | Mutual solvent | 0 |
| Kraton D-1122X | Unsaturated, radial-shape thermoplastic elastomer | 10 |
| Total | | 100 |

Example 9

| | | |
|---|---|---|
| Veova - 10 Monomer | Vinyl Ester of Neodecanoic Acid | 70 |
| Lauryl methacrylate | Monofunctional acrylate monomer | 0 |
| Resimene CE-6550 | Co-etherified amino resin crosslinker | 10 |
| Tripropyleneglycol dimethacrylate | Di-functional acrylate monomer/crosslinker | 10 |
| Kraton D-1122X | Unsaturated, radial-shape thermoplastic elastomer | 10 |
| Total | | 100 |

Example 10

| | | |
|---|---|---|
| Veova - 10 Monomer | Vinyl Ester of Neodecanoic Acid | 65 |
| Lauryl methacrylate | Monofunctional acrylate monomer | 0 |
| Resimene CE-6550 | Co-etherfied amino resin crosslinker | 5 |
| Tripropyleneglycol dimethacrylate | Di-functional acrylate monomer/crosslinker | 20 |
| Kraton D-1122X | Unsaturated, radial-shape thermoplastic elastomer | 10 |
| Total | | 100 |

EXAMPLE 11

Example 11 demonstrates the use in the field of an alternative resin formulation, containing a blend of at least one reactive ester having at least one carbon-carbon double bond, at least one unsaturated thermoplastic elastomer containing at least one carbon-carbon double bond soluble in the reactive ester, and at least one di- or tri-functional acrylate or methacrylate monomer soluble in non-aqueous drilling fluids and invert emulsion drilling fluids containing $C_7$ to $C_{20}$ olefins, esters, paraffinic oils and blends thereof, and also soluble in diesel and mineral oils and blends thereof with $C_7$ to $C_{20}$ olefins, esters, and paraffinic oils; and optionally containing other additives selected from one or more of coupling agents, suspending agents, dyes, weighting agents, lost circulation materials, and other additives known in the art, or any combination thereof, and further optionally containing a saturated thermoplastic elastomer.

A resin mixture was used to eliminate a casing string in a deepwater development well in the Gulf of Mexico. The upper Yellow sand had been previously produced by another well in the field. The lower Yellow sand was the producing formation for this new well and was at its original, unproduced pressure. The drilling fluid weight required to control formation pressures in the lower Yellow sand was close to or slightly greater than the fracture initiation pressure of the depleted upper Yellow sand.

The upper Yellow sand was present between 19,900 feet and 20,065 feet measured depth. Bottom-hole circulating temperature was 155° F. and the static bottom-hole temperature was estimated as 185° F. The hydrostatic pressure of the drilling fluid column in the wellbore while drilling the upper Yellow sand was approximately 6000 psi greater than the formation pore pressure. This substantial over-pressure increased the risk of fracturing the upper Yellow sand during drilling. Higher drilling fluid weights were required to drill and control the pore pressure of the higher pressured lower Yellow sand. This increased hydrostatic pressure would exceed the fracture initiation pressure of the upper Yellow sand.

A resin treatment to strengthen the upper Yellow sand prior to drilling the lower Yellow sand was planned as part of the well design. This treatment eliminated the need to set an additional steel casing string to isolate the upper and lower Yellow sands.

An acrylate monomer blend was added to the drilling mud. The unconsolidated upper Yellow sand had a compressive strength of about 20 to 30 psi and a permeability of between 500 and 600 md. Afterward the compressive strength of the sand was about 140 to 175 psi and the permeability was zero. There was no flow through the core observed or fracture of matrix with 1500 psi differential pressure after resin set.

Resin formulation:

| | | |
|---|---|---|
| 23.1 | gallons | Dilling Fluid (12.8 lb/gal) |
| 11.3 | gallons | Polyethyleneglycol 400 Dimethacrylate monomer |
| 3.8 | gallons | Trimethylolpropane trimethacrylate monomer |
| 100.1 | pounds | Barite |
| 0.15 | lbs | tertiary-Butyl Hydroperoxide catalyst |

It is noted that Veova-10 was not available at the time of this work so the formulation was prepared without it, but the inclusion of Veova-10 would be preferable.

Procedure:

A spot-and-squeeze technique was used for this treatment. The procedure follows:

1. Run drillstring and tag total depth. Total depth of the wellbore was approximately 100 feet below the bottom of the weak interval to be treated. The weak formation was approximately 125 feet thick. Hole diameter was 8.5 to 9 inch on average through this formation.
2. Pull up drillstring 50 feet above total depth.
3. Spot 50 bbls of the resin mixture across and extending above the top of the weak formation. The column length of the resin mixture was approximately 700 ft. Excess volume was spotted to allow a volume of the resin to be injected into the matrix of the formation.

Spotting the fluid is accomplished by pumping the resin mixture into the drill string, pumping a fluid (typically the drilling fluid) behind to displace the resin mixture out the end of the drill string and out into the annulus between the wellbore and drill string. The annulus is open at the surface to allow fluid to be circulated out of the wellbore as the resin mixture is placed.

4. After spotting the resin mixture in the wellbore, the drill string was pulled up approximately 300 feet above the top of the resin fluid pill spotted in wellbore.
5. The annular blowout preventer was closed.
6. Fluid was pumped down the drill string to squeeze the resin into the weak formation.
7. Radial penetration of the resin into the wellbore could be calculated from the volume of fluid squeezed into the formation, formation porosity, formation thickness (height) and wellbore diameter. Calculated radial penetration distance for the resin in this treatment was 1.5 m (4.8 feet).
8. After squeezing resin into the formation, the well was shut in for 8 hours prior to cleaning set resin out of the wellbore and resuming drilling operations to deepen the well.

The drilling fluid weight was increased to 13.9 lb/gal during drilling operations to total depth and no lost circulation occurred. The resin treatment effectively strengthened the formation near the wellbore. It was calculated the formulation penetrated the formation about 4.8 ft. and consolidated sand into a plastic composite.

The invention claimed is:

1. A method for strengthening a wellbore with an exposed gelogical formation comprising the steps of:
   determining or estimating material properties of the exposed geoiogical formation;
   determining changes necessary in material properties of the exposed geologic formation to achieve desired improvements in property of the exposed geologic formation; and
   treating the geological formation to improve material property values by injecting a formulation that hardens in-situ to form a geosynthetic composite;
   wherein the formulation comprises melamine-formaldehyde resin; and
   wherein the melamine-formaldehyde resin is soluble in non-aqueous drilling fluids and invert emulsion drilling fluids containing $C_7$ to $C_{20}$ olefins, esters, paraffinic oils and blends thereof, and also soluble in diesel and mineral oils and blends thereof with $C_7$ to $C_{20}$ olefins, esters, and paraffinic oils.

2. The method of claim 1 wherein the formulation further comprises one or more additives selected from catalysts and inhibitors to initiate and control time of polymerization, individually, or any combination thereof.

3. The method of claim 2 wherein the catalyst is selected from the group comprising a free radical initiating catalyst, azo compounds, alkyl or acyl peroxides or hydroperoxides, dialkyl peroxides, ketoperoxides, peroxy esters, peroxy carbonates, peroxy ketals, and combinations thereof.

4. The method of claim 3 wherein the free radical initiating catalyst is selected from the group consisting of benzoyl peroxide, dibenzoyl peroxide, diacetyl peroxide, di-t-butyl peroxide, cumyl peroxide, dicumyl peroxide, dilauryl peroxide, t-butyl hydroperoxide, methyl ketone peroxide, acetylacetone peroxide, methylethyl ketone peroxide, dibutylperoxyl cyclohexane, di (2,4-dichlorobenzoyl) peroxide, diisobutyl peroxide, t-butyl perbenzoate, t-butyl peracetate, and combinations thereof.

5. The method of claim 2 wherein the inhibitor is selected from the group consisting of quinones, hydroquinones, and catechols.

6. The method of claim 2 wherein the inhibitor is selected from the group consisting of benzoyl quinone, parabenzoquinone, methyl ethyl hydroquinone, and t-butyl catechol.

7. The method of claim 1 wherein the formulation further comprises a non-aqueous drilling fluid.

8. The method of claim 7 wherein the drilling fluid comprises components selected from the group consisting of $C_7$ to $C_{20}$ olefins, esters, paraffinic oils, diesel and mineral oils, $C_7$ to $C_{20}$ olefins, esters, and paraffinic oils.

9. The method of claim 1 wherein the formulation further comprises an additive selected from the group consisting of coupling agents, suspending agents, dyes, weighting agents, lost circulation materials, and combinations thereof.

10. The method of claim 1 wherein the formulation further comprises an additive selected from the group of catalysts and inhibitors to initiate and control time of polymerization.

11. The method of claim 1 wherein the formulation further comprising a coupling agent.

12. The method of claim 11 wherein the coupling agent is a silane coupling agent.

13. The method of claim 12 wherein the silane coupling agent is selected from the group consisting of vinyltrimethoxysilane, vinyltriethoxysilane, vinyltris(β-methoxyethoxy) silane, vinylmethyldimethoxysilane, vinylmethyldiethoxysilane, δ-glycidoxypropyltrimethoxysilane, δ-glycidoxypropylmethyldimethoxysilane, δ-methacryloxypropyltrimethoxysilane, δ-methacryloxypropylmethyldimethoxysilane, acryloxypropyltrimethoxysilane, acryloxypropylmethyldimethoxysilane, N-β-(aminoethyl)-δ-aminopropyltrimethoxysilane, N-β-(aminoethyl)-δ-aminopropyltriethoxysilane, N-β-(aminoethyl)-δ-aminopropylmethyldimethoxysilane, N-β-(aminoethyl)-δ-aminopropylmethyldiethoxysilane, and mixtures thereof.

14. The method of claim 12 wherein the silane coupling agent is a bifunctional sulfur-containing organo silanes.

15. The method of claim 12 wherein the silane coupling agent is selected from bis- (3-triethoxy-silylpropyl) tetrasulfide, bis- (3-trimethoxy-silyl propyl) tetrasulfide, and bis-(3-trimethoxy-silylpropyl) tetrasulfide grafted silica.

16. The method of claim 12 wherein the concentration of coupling agent is in the range of from about 0 to 10 wt percent.

17. The method of claim 1 wherein the amount of formulation applied in treating the geological formation is determined based on the minimum radial penetration distance of the chemical treatment determined to be necessary to obtain a desired improvement in a property of the geological formation.

18. The method of claim 1 wherein the volume of formulation used is determined from radial penetration distance form the wellbore, length of interval to be treated, wellbore diameter and porosity of the geological formation.

19. The method of claim 1 wherein the property is fracture pressure.

20. The method of claim 1 wherein the treatment eliminates a need for setting an additional casing string as drilling operations continue.

21. The method of claim 1 wherein the property is permeability.

22. A method for strengthening a wellbore with an exposed geological formation comprising the steps of:
   determining or estimating material properties of the exposed geological formation;
   determining changes necessary in material properties of the exposed geologic formation to achieve desired improvements in property of the exposed geologic formation; and
   treating the geological formation to improve material property values by injecting a formulation that hardens in-situ to form a geosynthetic composite;
   wherein the formulation comprises melamine-formaldehyde resin and at least one polyol and/or poly (hydroxy) ether.

23. The method of claim 22 wherein the formulation comprises a polyol that is soluble in the melamine-formaldehyde resin component and also in a hydrocarbon phase of a drilling/completion fluid.

24. The method of claim 22 wherein the polyol is selected from the group consisting of ethylene glycol, propylene glycol, glycerol, diethylene glycol, triethylene glycol, polyethylene glycol, polypropylene glycol, and polyethylenepropylene glycol.

25. The method of claim 22 wherein the melamine-formaldehyde resin is blended with a poly (hydroxy) ether that is soluble in the reactive component and also in the hydrocarbon phase of the drilling/completion fluid.

26. The method of claim 25 wherein the poly (hydroxy) ether is a high molecular weight poly (hydroxy) ether.

27. The method of claim 25 wherein the poly (hydroxy) ether is characterized by ether linkages and pendant hydroxyl groups that promote wetting and bonding to polar substrates and fillers.

28. The method of claim 25 wherein the poly (hydroxy) ether is present in an amount in the range of 10 to 30% by volume.

29. The composition of claim 25 wherein the poly (hydroxy) ether is a poly (hydroxy) ether with a predominantly linear structure.

30. The composition of claim 22 wherein the amount of polyol is in the range of 10 to 30% by volume.

31. The method of claim 22 wherein the formulation comprises: at least one reactive ester having at least one carbon-carbon double bond selected from vinyl esters of versatic acids and vinyl esters of long chain fatty acids; at least one unsaturated thermoplastic elastomer containing at least one carbon-carbon double bond soluble in the reactive ester; and a di- or tri-functional acrylate or methacrylate monomer.

32. The method of claim 31 wherein the vinyl ester of a long chain fatty acid is selected from vinyl pelargonate, vinyl stearate, vinyl laurate, and blends thereof.

33. The method of claim 31 wherein the unsaturated thermoplastic elastomer soluble in the reactive ester is selected from linear, radial, or star configuration di- or ttr-block polymer(s) having at least one unsaturated carbon-carbon bond.

34. The method of claim 31 wherein the unsaturated thermoplastic elastomer is selected from di- or tri- polymers comprising styrene-butadiene-styrene or styrene-isoprene-styrene.

35. The method of claim 31 wherein the unsaturated thermoplastic elastomer has a styrene: rubber ratio between 15:85 and 75:25.

36. The method of claim 31 wherein the amount of unsaturated thermoplastic elastomer present in the composition is in the range of 5 to 20 wt percent.

37. A method for strengthening a wellbore with an exposed geological formation comprising the steps of:
   determining or estimating material properties of the exposed geological formation;
   determining changes necessary in material properties of the exposed geologic formation to achieve desired improvements in property of the exposed geological formation; and
   treating the geological formation to improve material property values by injecting a formulation that hardens in-situ to form a geosynthetic composite;
   wherein the formulation comprises melamine-formaldehyde resin and a saturated thermoplastic elastomer.

38. A method for strengthening a wellbore with an exposed geological formation comprising the steps of:
   determining or estimating material properties of the exposed geological formation;
   determining changes necessary in material properties of the exposed geologic formation to achieve desired improvements in property of the exposed geologic formation;
   treating the geological formation to improve material property values by injecting a formulation that hardens in-situ to form a geosynthetic composite,
   wherein the treating step comprises:
      spotting the formulation across from and extending above a portion of the exposed geological formation to be treated;
      closing an annular blowout preventor; and
      pumping additional treatment fluid into the wellbore to squeeze the formulation into the formation.

39. The method of claim 38 wherein the step of spotting the formulation in the wellbore is accomplished by injecting the treatment fluid through a drill string at or near to bottom of the portion of the exposed geological formation to be treated.

40. The method of claim 39 further comprising the step of pulling up the drill string to near the top of the spotted treatment fluid.

41. The method of claim 39 wherein the drill string is pulled up to a position above the spotted treatment fluid.

42. The method of claim 41 wherein the drill string is pulled up to a position about 300 feet above the spotted treatment fluid.

43. The method of claim 38 wherein after the additional treatment fluid is pumped, contents of the wellbore are circulated out of the wellbore.

* * * * *